(12) United States Patent
Porcari (10) Patent No.: US 10,869,485 B2
(45) Date of Patent: Dec. 22, 2020

(54) AUTOMATIC TABLE-TOP MACHINE FOR KNEADING AND EXTRUDING PASTA

(71) Applicant: IMPERIA & MONFERRINA s.p.a., Rome (IT)

(72) Inventor: Gabriele Porcari, Rome (IT)

(73) Assignee: IMPERIA & MONFERRINA S.P.A., Rome (IT)

( * ) Notice: Subject to any disclaimer, the term of this patent is extended or adjusted under 35 U.S.C. 154(b) by 771 days.

(21) Appl. No.: 15/298,622

(22) Filed: Oct. 20, 2016

(65) Prior Publication Data
US 2017/0112146 A1  Apr. 27, 2017

(30) Foreign Application Priority Data

Oct. 21, 2015  (IT) .................. 102015000064089

(51) Int. Cl.
| | |
|---|---|
| A21C 1/06 | (2006.01) |
| A21C 1/14 | (2006.01) |
| A21C 11/20 | (2006.01) |
| A21C 11/16 | (2006.01) |
| A21C 1/00 | (2006.01) |

(52) U.S. Cl.
CPC .............. *A21C 1/065* (2013.01); *A21C 1/06* (2013.01); *A21C 1/14* (2013.01); *A21C 1/144* (2013.01); *A21C 1/149* (2013.01); *A21C 11/16* (2013.01); *A21C 11/20* (2013.01)

(58) Field of Classification Search
CPC ........... A21C 11/16; A21C 11/20; A21C 1/06; A21C 1/065; A21C 1/14; A21C 1/144; A21C 1/149

USPC ........................... 425/192, 190, 151; 366/97
See application file for complete search history.

(56) References Cited

U.S. PATENT DOCUMENTS

| | | | |
|---|---|---|---|
| 4,269,582 A | 5/1981 | Mella | |
| 4,332,539 A * | 6/1982 | Zani | A21C 1/06 425/151 |
| 4,391,575 A * | 7/1983 | Osrow | A21C 1/06 366/196 |
| 4,883,361 A * | 11/1989 | Valentino | A21C 1/06 366/97 |
| 5,460,506 A | 10/1995 | Price | |

FOREIGN PATENT DOCUMENTS

KR  20100008840 U  9/2010

* cited by examiner

*Primary Examiner* — Matthew J Daniels
*Assistant Examiner* — Yunju Kim
(74) *Attorney, Agent, or Firm* — Lucas & Mercanti, LLP; Klaus P. Stoffel (57) ABSTRACT

An machine for kneading and extruding pasta, having a body, a motor having a horizontal output shaft, a transmission from the output shaft to a horizontal driven shaft parallel to the output shaft and coaxial to a shaft of a kneading reel, projecting externally to the body in a dough forming tank. The body includes a load-bearing frame, including a sheet metal plate bent substantially 90° to provide a horizontal base, fixed relative to a support, and a vertical wall, on which the dough forming tank is fixed, and an inner reinforcement having a first vertical plate fixed relative to the horizontal base, parallel to and spaced from the vertical wall, a second vertical plate fixed to the inner face of the vertical wall, and a bearing for supporting the output shaft and the driven shaft relative to the first and second plate.

4 Claims, 9 Drawing Sheets

AUTOMATIC TABLE-TOP MACHINE FOR KNEADING AND EXTRUDING PASTA

CROSS-REFERENCE TO RELATED APPLICATIONS

The present application claims priority of IT 10 2015 000 064 089, filed Oct. 21, 2015, the priority of this application is hereby claimed and this application is incorporated herein by reference.

BACKGROUND OF THE INVENTION

The present invention refers to an automatic table-top machine for kneading and extruding pasta.

Automatic table-top machines for kneading and extruding pasta are known.

Machines of the type specified are positioned, for use, on a special off-the-ground support, namely table-top, and can also be connected to a tray that collects the pasta as it is extruded. The vibrations caused by stresses inside the machine body are therefore transmitted to the table and to the tray, resulting in potential noise and mechanical wear of said devices.

SUMMARY OF THE INVENTION

The present invention, starting from the notion of the aforesaid problems, intends to provide a solution.

An object of the present invention is to provide an automatic table-top machine for kneading and extruding pasta that allows the stresses inside the machine body to be greatly limited, thereby avoiding the above problem.

Another object of the present invention is to provide a machine as stated, which has an essentially simple structure, is easy to install and to carry out subsequent maintenance on, and has relatively low costs.

In view of these objects, the present invention provides an automatic table-top machine for kneading and extruding pasta.

In particular, according to the present invention, the automatic table-top machine for kneading and extruding pasta, comprising a machine body, which includes electric gear motor means having an output shaft with horizontal axis, transmission means from said output shaft to a driven shaft with axis horizontal and parallel to the axis of said output shaft and coaxial to a shaft of a kneading reel, projecting externally to said machine body in a dough forming tank, having below and parallel to said shaft of the kneading reel an extrusion channel, in which there is arranged a worm screw coaxial with respect to said output shaft, which feeds in the manner of an auger extrusion means for forming pasta, is characterized in that said machine body comprises:

a load-bearing frame, including a sheet metal plate bent substantially to 90° and which provides, in a single body, a horizontal base, fixed with respect to supporting means on said table, and a vertical wall, on the outer face of which said dough forming tank is fixed, and     an inner reinforcement comprising:

first plate support means, including a first vertical plate, which is fixed with respect to said horizontal base, parallel to and spaced from said vertical wall,     second plate support means, including a second vertical plate, which is fixed to the inner face of said vertical wall, and     bearing means for supporting and sustaining said output shaft and said driven shaft, supported with respect to said first plate and to said second plate.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

In the aforesaid figures from 1 to 6 and 9, the number 10 indicates, as a whole, an automatic table-top machine for kneading and extruding pasta according to an example of embodiment of the present invention.

Figure 9:
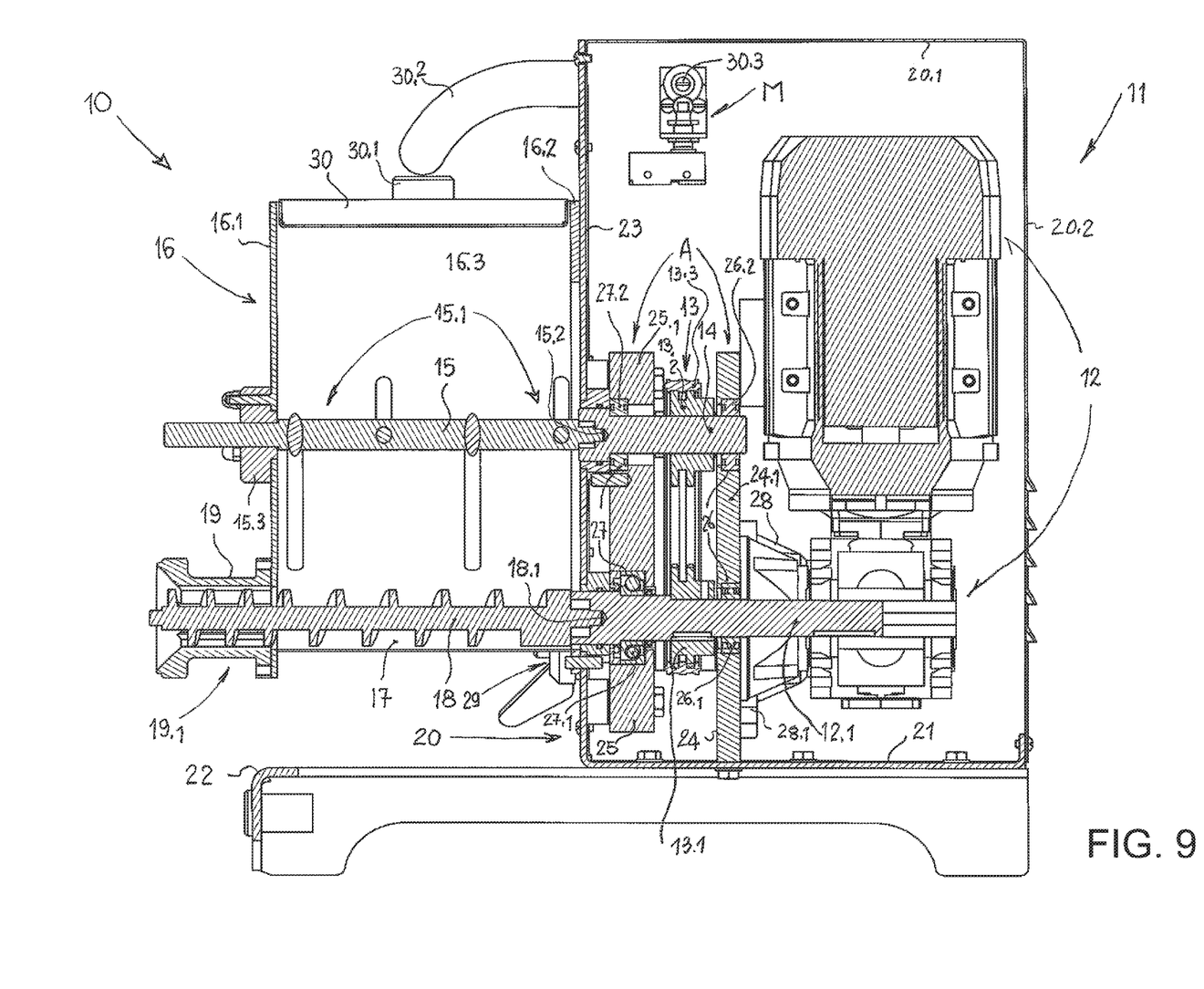
FIG. 9 is a vertical sectional view of the machine of FIG. 1.

Said automatic table-top machine 10 for kneading and extruding pasta comprises, according to the prior art, a machine body 11, which includes electric gear motor means 12 having an output shaft 12.1 with horizontal axis, transmission means 13 from said output shaft 12.1 to a driven shaft 14 with axis horizontal and parallel to the axis of said output shaft 12.1 and coaxial to a shaft 15 of a kneading reel 15.1, projecting externally to said machine body 11 in a dough forming tank 16, having below and parallel to said shaft 15 of the kneading reel 15.1 an extrusion channel 17, in which there is arranged a worm screw 18 coaxial with respect to said output shaft 12.1, which feeds in the manner of an auger extrusion means 19 for forming pasta (FIG. 9).

More specifically, said reel 15.1 comprises a plurality of radial fingers fixed with respect to said shaft 15 and angularly staggered from one another.

Figure 5:
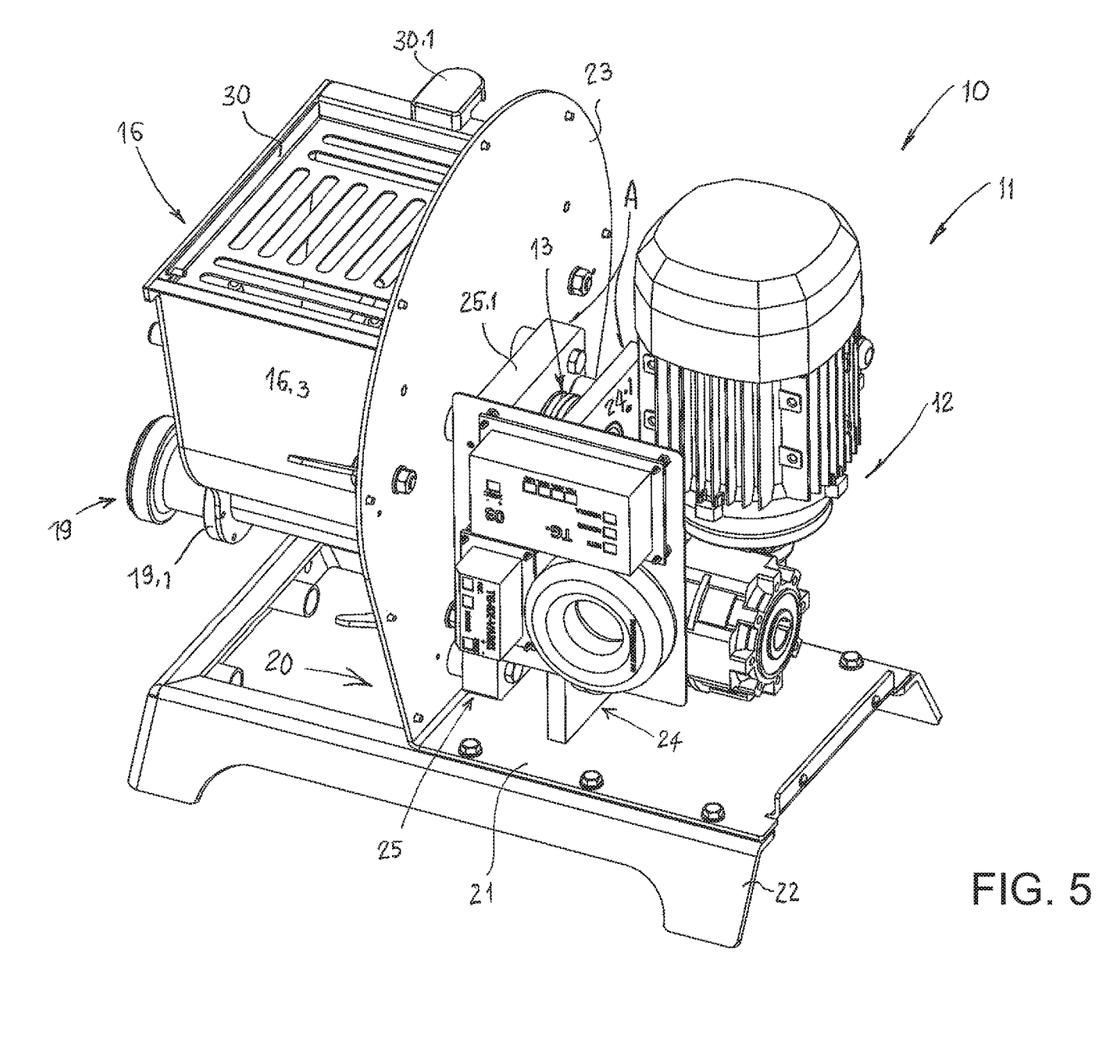
FIG. 5 is a rear perspective view from above of the ma-chine of FIG. 4, with a hood part remove for clearer illustration.

In particular, according to the present invention said machine body 11 advantageously comprises:

a load-bearing frame 20, including a sheet metal plate bent substantially to 90° and which provides, in a single body, a horizontal base 21, fixed with respect to supporting means 22 on said table, and a vertical wall 23, on the outer face of which said dough forming tank 16 is fixed (FIGS. 5 and 9), and an inner reinforcement A comprising:

first plate support means 24, including a first vertical plate 24.1, which is fixed with respect to said horizontal base 21, parallel to and spaced from said vertical wall 23, second plate support means 25, including a second vertical plate 25.1, which is fixed to the inner face of said vertical wall 23, and bearing means 26, 27 for supporting and sustaining said output shaft 12.1 and said driven shaft 14, supported with respect to said first plate 24 and to said second plate 25 (FIGS. 5 and 9).

In this way, the stresses acting on said shafts 12.1, 14 are transmitted, through said reinforcement A, to said load-bearing frame 20 in an evenly distributed manner with respect to said horizontal base 21 and to said vertical wall 23, overcoming the aforesaid problems of the prior art.

The machine body 11 is enclosed between said load-bearing frame 20 and an encircling and removable hood 20.1, having a removable vertical rear wall 20.2, opposite said vertical wall 23.

More specifically, according to the present invention:

said first plate support means 24 include said first vertical plate 24.1, which is fixed with respect to said horizontal base 21, parallel to and spaced from said vertical wall 23, and supports, in respective through holes with horizontal and parallel axes, first bearing means 26.1, through which the output shaft 12.1 of said gear motor means 12 passes, and second bearing means 26.2 over said first bearing means 26.1, said second plate support means 25 include said second vertical plate 25.1, which is fixed to the inner face of said vertical wall 23 and supports, at respective through holes with horizontal and parallel axes, third bearing means 27.1, in which the end of said output shaft 12.1 distal from said gear motor means 12 is supported, and fourth bearing means 27.2 over said third bearing means 27.1 (FIG. 9). Said driven shaft 14 is sup-ported rotating freely between said third bearing means 26.2 and fourth bearing means 27.2.

It should be noted that said vertical plate 25.1 is connected with respect to said vertical wall 23 through spacer means.

More in particular, said transmission means 13 include first pinion means 13.1 mounted coaxial on said output shaft 12.1 and second pinion means 13.2 mounted coaxial on said driven shaft 14, wherein said first 13.1 and second 13.2 pinion means are arranged in proximity of the face of said first plate 24.1 proximal to said vertical wall 23, and flexible transmission means 13.3, which engage said first 13.1 and second 13.2 pinion means (FIG. 9). In the example illustrated (FIG. 9) said flexible transmission means 13.3 consist of a transmission belt, or alternatively they can be produced in the manner of a transmission chain. Moreover, in place of pinion means, pulley means can be provided (variant not illustrated).

Figure 6:
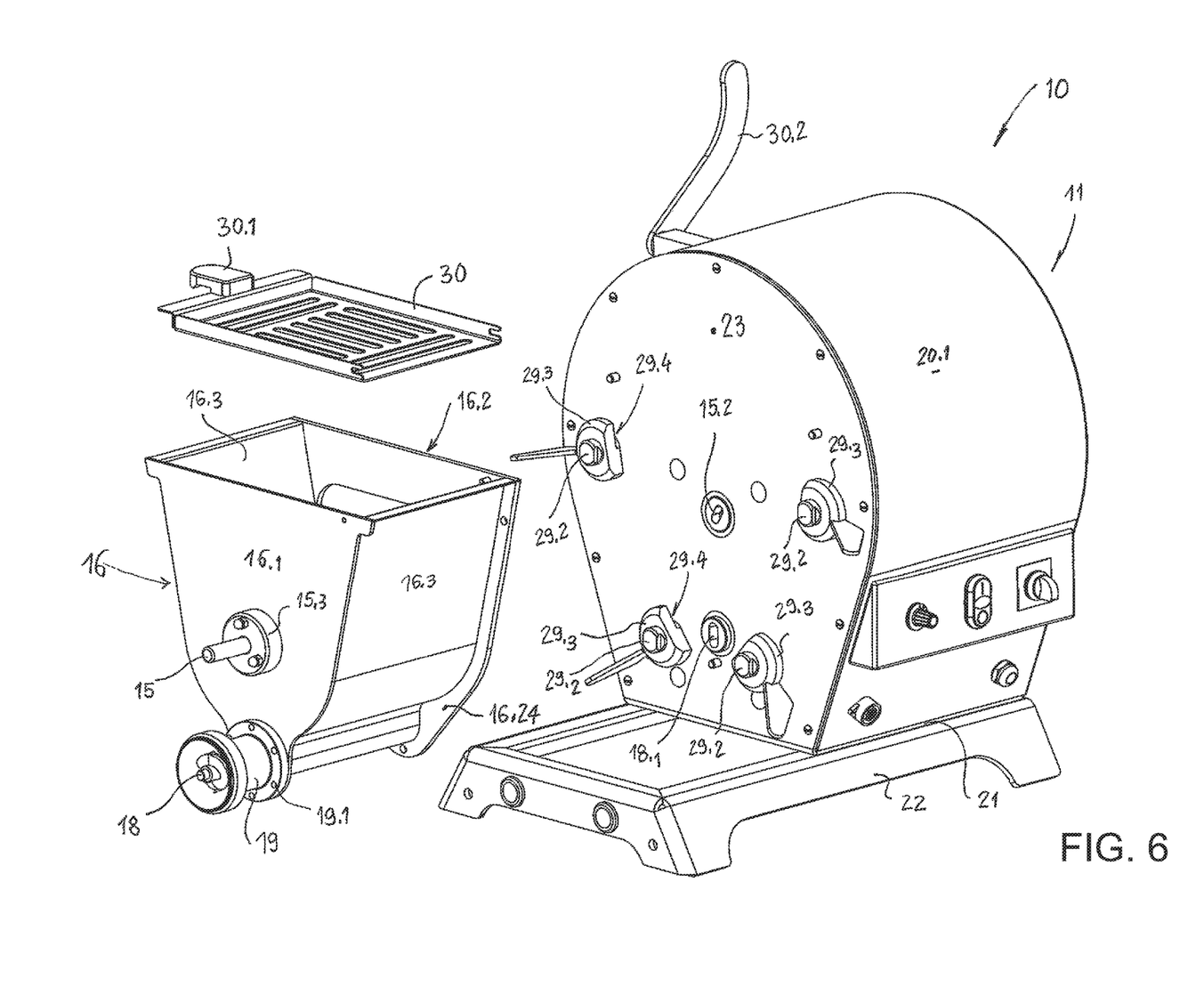
FIG. 6 is a front perspective view of the machine of FIG. 1, in which a dough forming tank and relative lid are illustrated in an exploded view with respect to a machine body.
Figure 7:
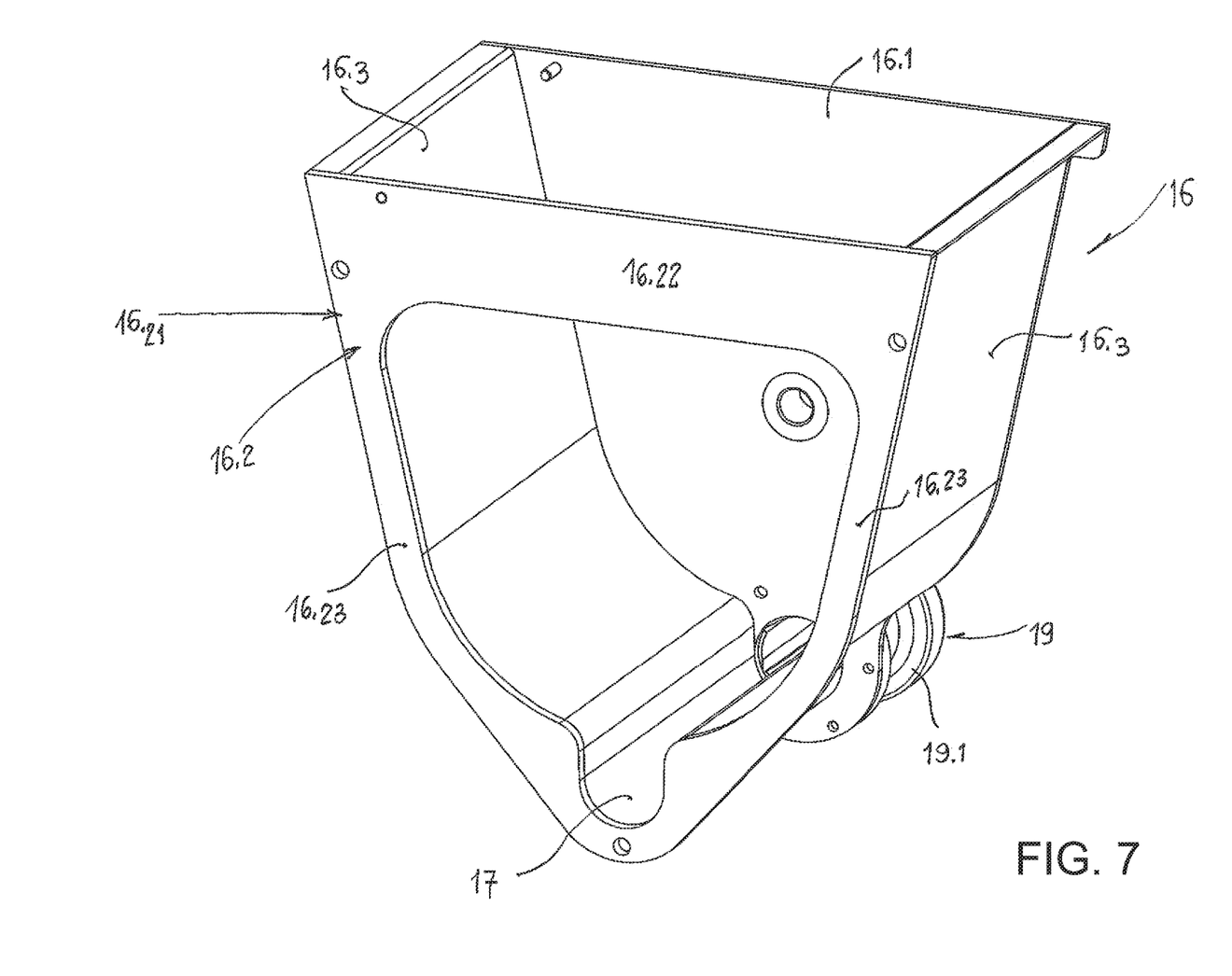
FIG. 7 is a rear perspective view of said dough forming tank.
Figure 8:
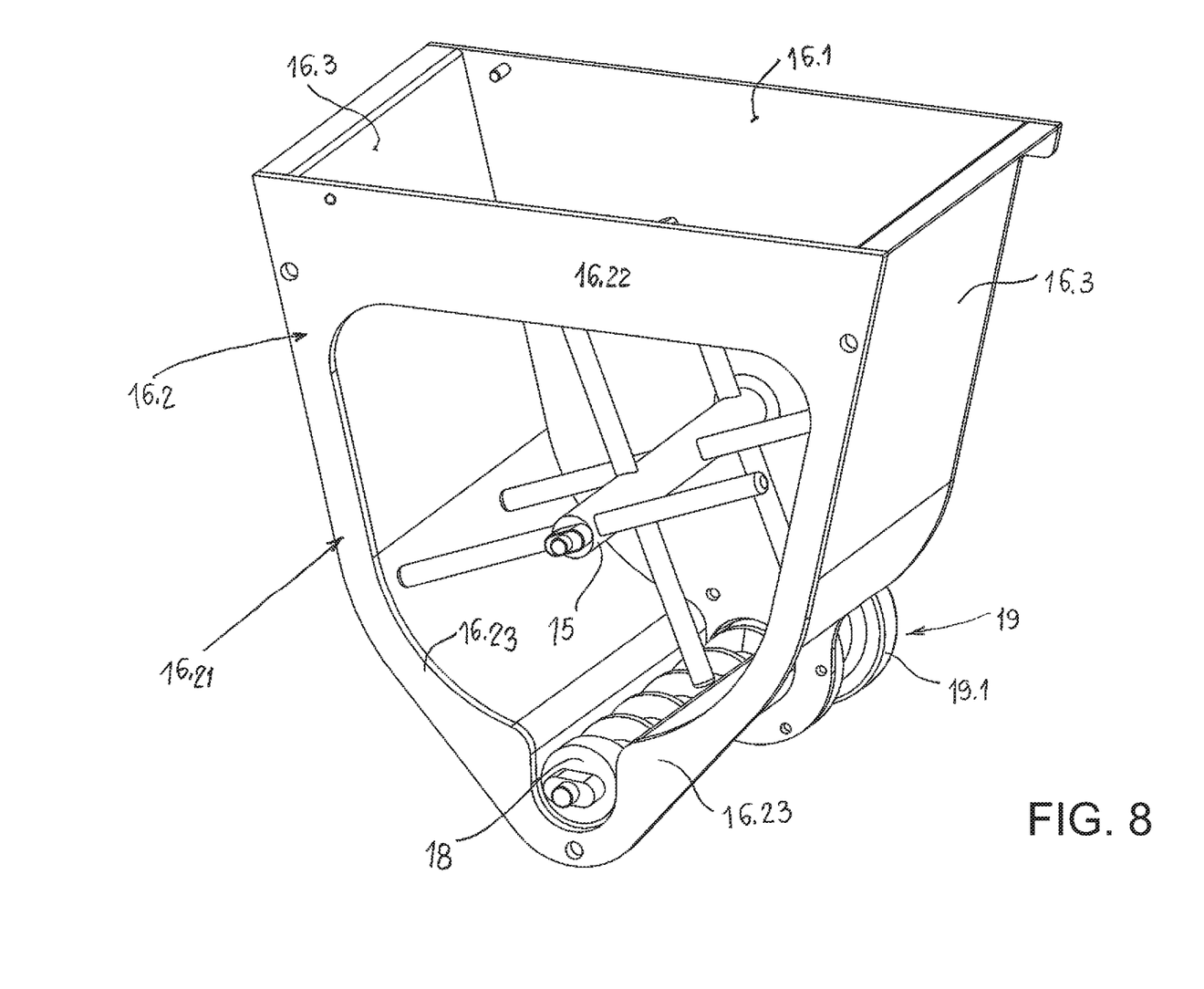
FIG. 8 is a view similar to that of FIG. 7, but wherein the operating tools, i.e. a kneading reel and a worm screw, are illustrated in said dough forming tank.

The end of said driven shaft 14 supported by said fourth bearing means 27.2 is facing the outside of said vertical wall 23 of said load-bearing frame 20 through a corresponding through hole, and has said detachable connection means 15.2 with axial coupling for a corresponding end of said shaft 15 of the kneading reel, which is rotated integral with the driven shaft 14 (FIGS. 6 and 9).

Moreover, the end of said output shaft 12.1 supported by said third bearing means 27.1 is facing the outside of said vertical wall 23 of said load-bearing frame 20 through a corresponding through hole, and has said detachable connection means 18.1 with axial coupling for a corresponding end of said worm screw 18, which is rotated integral with the output shaft 12.2 (FIGS. 6 and 9).

Figure 4:
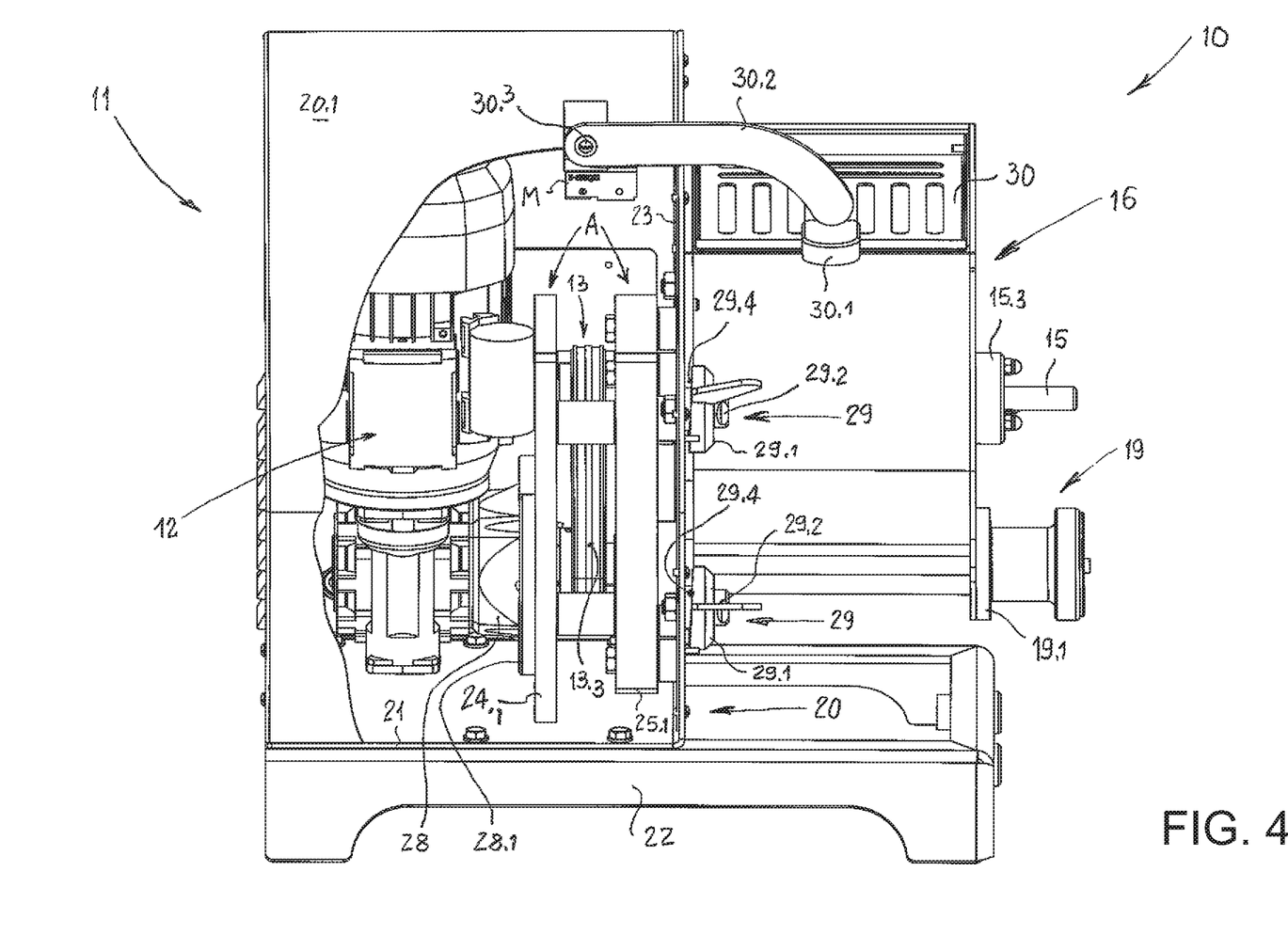
FIG. 4 is a lateral perspective view from above of the machine of FIG. 1, with parts in a partially cutaway view.

Advantageously, according to the present invention, said inner reinforcement A comprises a substantially bell-shaped support 28, axially perforated, having a peripheral outer flange 28.1 at the larger base thereof, and fixed by means of said flange 28.1 to the face of said first plate 24.1 distal from said vertical wall 23, said substantially bell-shaped support 28 being axially passed through by said output shaft 12.1 and supporting said gear motor means 12 in a cantilever fashion (FIGS. 4 and 9).

According to the present invention, said dough forming tank 16 is fixed with respect to said machine body 11 through detachable connection means 29 and is supported in a cantilever fashion with respect to said vertical wall 23 of said load-bearing frame 20 (FIGS. 1, 2, 4, 6 and 9).

Advantageously, said worm screw 18 is connected, at one end thereof, through detachable connection means 18.1 with respect to said output shaft 12.1 and, at the other end, is supported coaxially with respect to said extrusion means 19.

Preferably, said shaft 15 of the reel 15.1 is connected through said detachable connection means 15.2 with respect to said driven shaft 14.

As can be seen from the accompanying FIGS. 1, 2, 7 and 8, said tank 16 is structured in the manner of a hopper 16.1, having two lateral chute-like walls 16.3, opposite and converging at the bottom into said extrusion channel 17, and two opposite walls, front 16.1 and rear 16.2, substantially vertical.

As can be seen in the example of embodiment illustrated (FIGS. 7 and 8), said rear wall 16.2 of said tank 16 is juxtaposed against the vertical wall 23 of said machine body 11, and is structured as an essentially triangular stiffening frame 16.21, comprising an upper horizontal cross-member 16.22, which forms a top edge of said tank 16, and a pair of essentially "V-shaped" branches 16.23 that form respective edges of said opposite lateral walls 16.3 and of said channel 17 of said tank 16.

Figure 1:
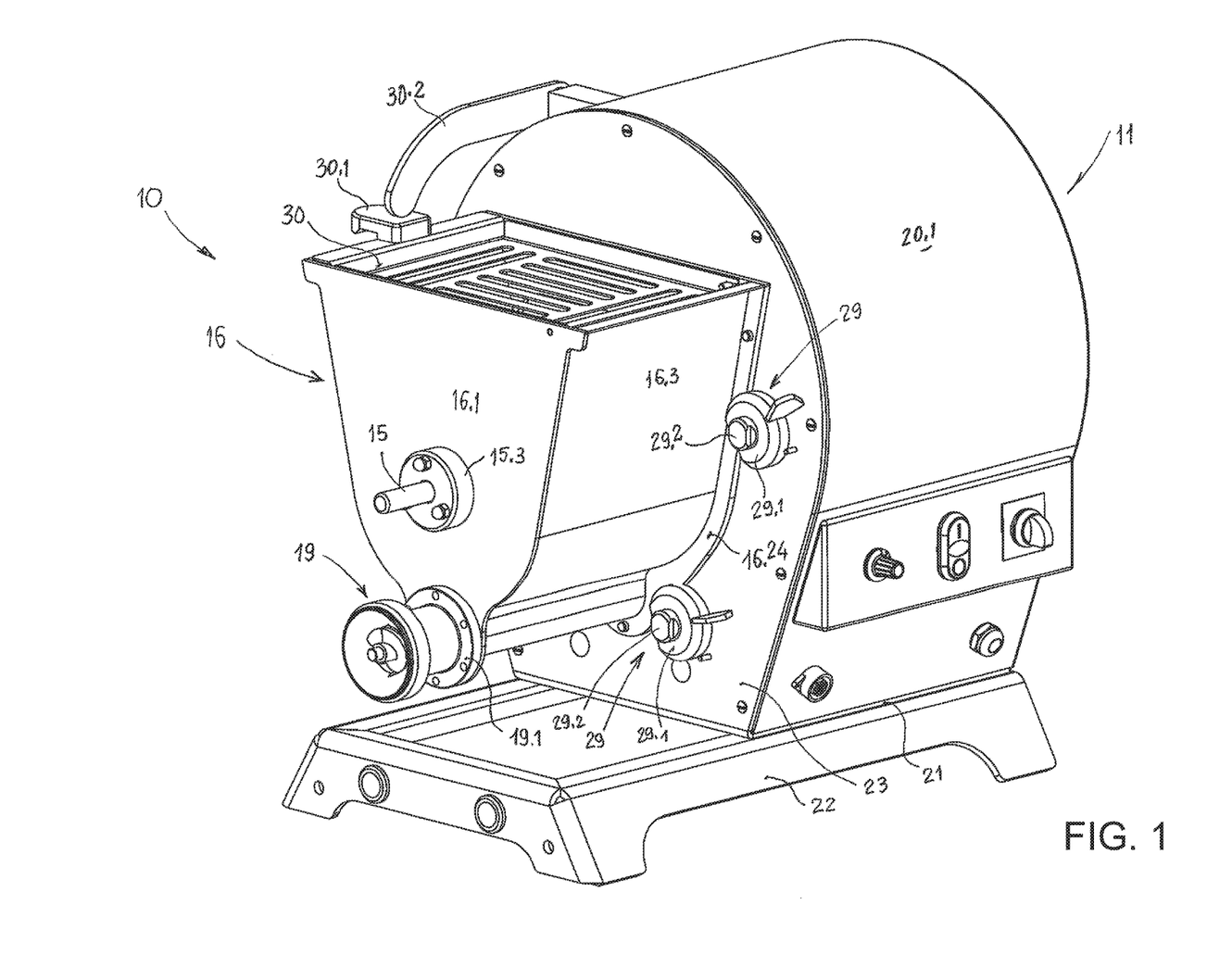
FIG. 1 is a perspective view from one side of an example of embodiment of the automatic table-top machine for kneading and extruding pasta according to the present invention.
Figure 2:
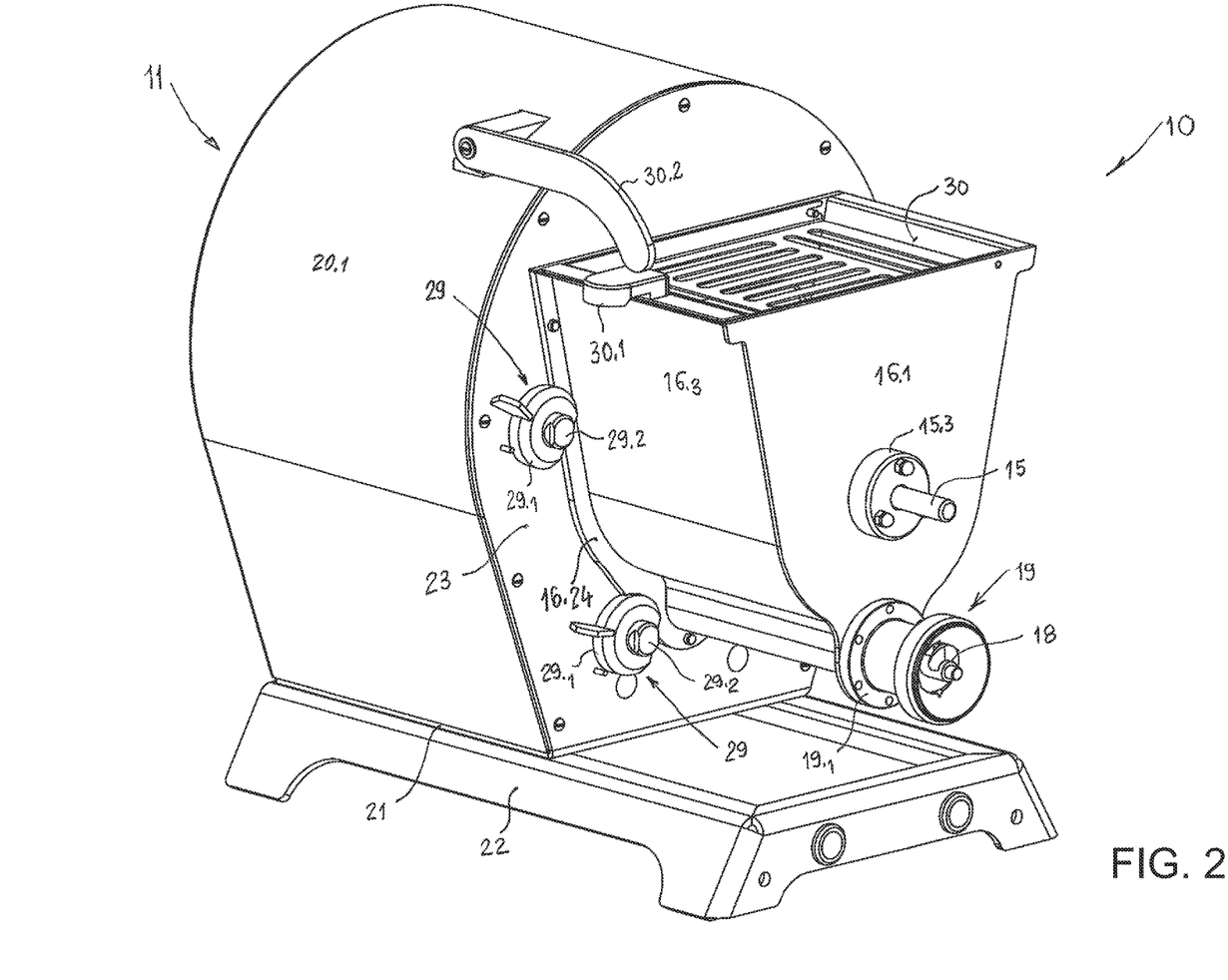
FIG. 2 is a perspective view from the other side of the machine of FIG. 1.
Figure 3:
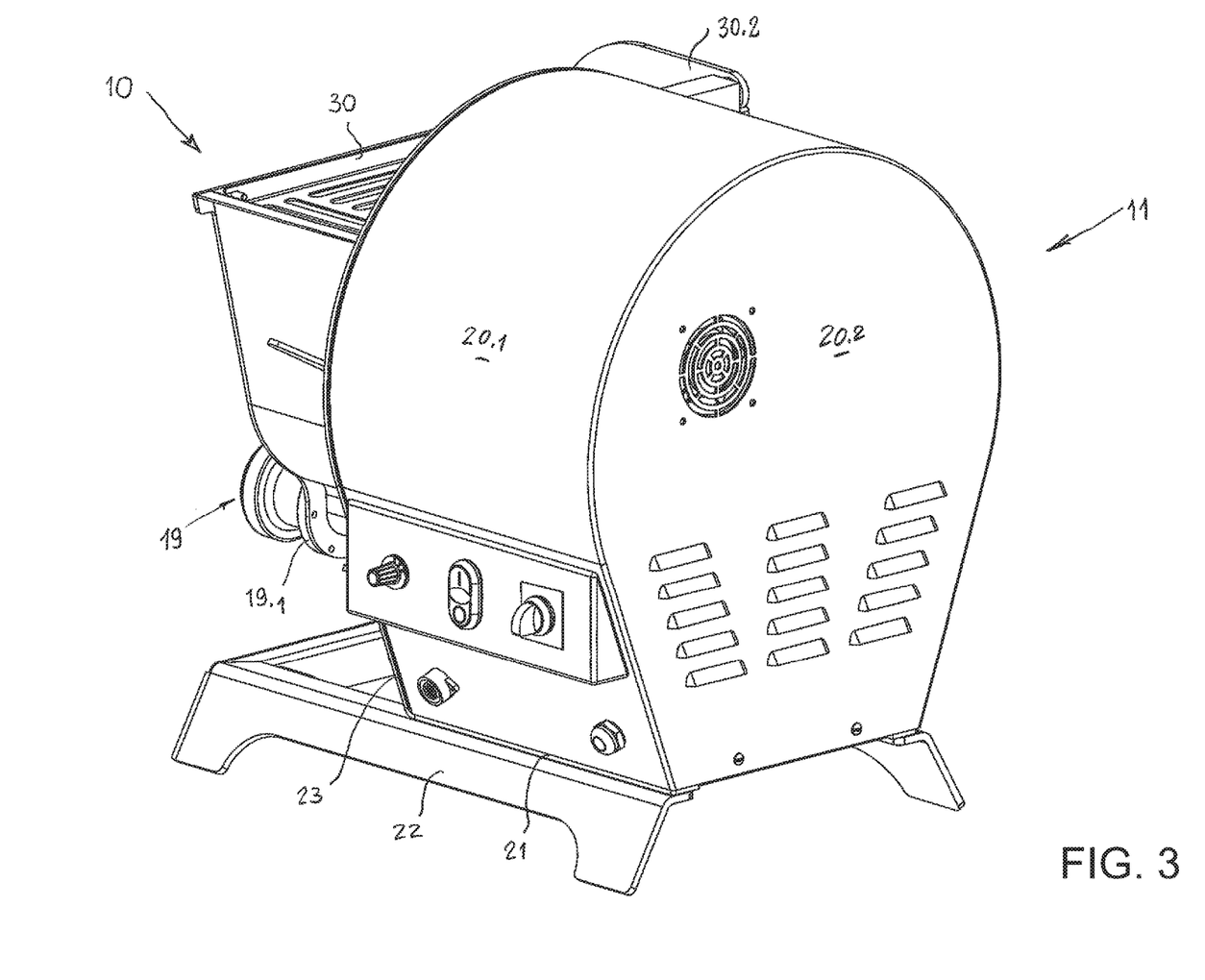
FIG. 3 is a rear perspective view of the machine of FIG. 1.

In particular, said peripheral frame 16.21 is extended beyond said tank 16 and provides an outer flange 16.24 fixed with respect to said tank 16 (FIGS. 1 and 2).

Said tank 16 is fixed with respect to said machine body 11 through said detachable connection means 29 and is supported in a cantilever fashion with respect to said vertical wall 23 of said load-bearing frame 20 (FIGS. 1, 2, 4 and 9).

Advantageously, said detachable connection means 29 connect said outer flange 16.24 with respect to said vertical wall 23 of said load-bearing frame 20.

As can be seen in particular in FIGS. 1, 2, 4 and 6, said detachable connection means 29 comprise a plurality of manually controlled cam means 29.1, arranged on the outer face of said vertical wall 23 of said load-bearing frame 20, each of which comprises a cam 29.3 rotating about a respective pin 29.2 with axis horizontal and parallel to the axes of said shafts 12.1, 14, 15, fixed to said vertical wall 23 in proximity of said outer flange 16.24, wherein said rotating cam 29.3 has a front cam ramp 29.4, which engages, in one direction of rotation, said outer flange 16.24 of said tank 16, fixing the flange with pressure against said vertical wall 23 of said machine body 11, and, in the opposite direction of rotation, disengages said outer flange 16.24 of said tank 16, allowing removal of said tank 16.

Said cam means 29 comprise a radial wing integral with the cam body 29.3, for the manual rotation of these same means.

Advantageously, said extrusion means 19 are structured as a removable extrusion nozzle 19.1, fixed to the outer face of said front wall 16.1 of said tank 16 and in which one end of said worm screw 18 is supported coaxially.

Preferably, said automatic machine 10 comprises a supporting and centering bushing 15.3 fixed to the outer face of said front wall 16.1 of said tank 16, at a respective through hole and axially aligned with respect to said driven shaft 14, one end of said shaft 18 of the reel 18.1 passing through said respective hole of said front wall 16.1 being supported coaxially and in a rotating and removable manner in said bushing 15.3.

More in particular, as can be seen in the accompanying figures, said automatic machine 10 comprises, according the present example of embodiment of the invention:

- a lid 30 that closes, in a removable manner, a top opening of said tank 16 with hopper 16.1 and which has a lid part 30.1;
- a lever arm 30.2 pivoting about a respective pin 30.3 with horizontal axis, fixed with respect to said machine body 11, said arm 30.2 which can be pivoted in operation to a first pivoted position, in which a first part thereof rests by gravity in contact with said lid part 30.1 (FIGS. 1, 2, 4 and 9), and to other pivoted positions (FIG. 6), in which said first part thereof does not rest by gravity in contact with said lid part 30.1, and
- microswitch means M, electrically connected with respect to an electric circuit to supply and control said gear motor means 12 and a member of which moving between an electrically closed position and an electrically open position is operatively associated with another part of said pivoting arm 30.2, so that the arrangement of said arm 30.2 in said first pivoted position causes the electrical closing of said electric circuit through said microswitch means M, while the arrangement of said arm 30.2 in said other pivoted positions causes the electrical opening of said electric circuit through said microswitch means M.

This ensures the operating safety of the machine 10, which can only function with the lid 30 closed over the tank 16 and the pivoting arm 30.2 resting by gravity on the part 30.1 of said lid 30.

Advantageously, said automatic machine according to the invention comprises a gasket (not shown) interposed between said rear wall of said tank with corresponding outer flange of the same tank and said vertical wall of said machine body.

As is apparent from the above, said automatic table-top machine 10 for kneading and extruding pasta according to the present invention allows the stresses inside the machine body to be greatly limited, thereby avoiding the above problem.

Moreover, said machine 10 as stated, has an essentially simple structure, is easy to install and to carry out subsequent maintenance on, and has relatively low costs.

As is apparent from the above, the present invention allows the objects specified in the introduction to be achieved in a simple and advantageous manner.

While specific embodiments of the invention have been shown and described in detail to illustrate the inventive principles, it will be understood that the invention may be embodied otherwise without departing from such principles.

I claim:

1. An automatic table-top machine for kneading and extruding pasta, comprising a machine body, which includes electric gear motor means having an output shaft with horizontal axis, transmission means from said output shaft to a driven shaft with axis horizontal and parallel to the axis of said output shaft and coaxial to a shaft of a kneading reel, projecting externally to said machine body in a dough forming tank, having below and parallel to said shaft of the kneading reel an extrusion channel, in which there is arranged a worm screw coaxial with respect to said output shaft, which feeds in the manner of an auger extrusion means for forming pasta, wherein said machine body comprises:

- a load-bearing frame, including a sheet metal plate bent substantially to 90° and which provides, in a single body, a horizontal base, fixed with respect to a support member on said table, and a vertical wall, on the outer face of which said dough forming tank is fixed, and
- an inner reinforcement comprising:
- first plate support means, including a first vertical plate, which is fixed with respect to said horizontal base, parallel to and spaced from said vertical wall,
- second plate support means, including a second vertical plate, which is fixed to the inner face of said vertical wall, and
- bearing means for supporting and sustaining said output shaft and said driven shaft, supported with respect to said first plate and to said second plate, so that the stresses acting on said shafts are transmitted, through said reinforcement, to said load-bearing frame in an evenly distributed manner with respect to said horizontal base and to said vertical wall,
- wherein said inner reinforcement comprises a substantially bell-shaped support, axially perforated, having a peripheral outer flange at the larger base thereof, and fixed by means of said flange to the face of said first plate distal from said vertical wall, said substantially bell-shaped support being axially passed through by said output shaft and supporting said gear motor means in a cantilever fashion.

2. The automatic table-top machine for kneading and extruding pasta according to claim 1, wherein said dough forming tank is fixed with respect to said machine body through detachable connection means and is supported in a cantilever fashion with respect to said vertical wall of said load-bearing frame.

3. The automatic table-top machine for kneading and extruding pasta according to claim 1, wherein said worm screw is detachably connected, at one end thereof, to said output shaft and, at the other end, is supported coaxially with respect to said extrusion means.

4. The automatic table-top machine for kneading and extruding pasta according to claim 1, wherein said shaft of the reel is detachably connected to said driven shaft.

* * * * *